United States Patent [19]

Becker et al.

[11] Patent Number: 4,463,819
[45] Date of Patent: Aug. 7, 1984

[54] HYDRAULIC CONTROL VALVE

[75] Inventors: Manfred Becker; Hilmar Ortlepp, both of Mannheim, Fed. Rep. of Germany

[73] Assignee: Deere & Company, Moline, Ill.

[21] Appl. No.: 417,731

[22] Filed: Sep. 13, 1982

[30] Foreign Application Priority Data

Sep. 14, 1981 [EP] European Pat. Off. ....... 81 107228.9

[51] Int. Cl.³ .............................................. B62D 5/06
[52] U.S. Cl. ..................................... 180/132; 60/384; 60/385; 74/388 PS; 91/433; 137/625.66
[58] Field of Search .............. 180/132, 79; 74/388 PS; 137/625.66; 60/384, 385, 386; 91/433

[56] References Cited

U.S. PATENT DOCUMENTS

| 3,246,472 | 4/1966 | Kries ...................................... 60/386 |
| 3,436,915 | 4/1969 | Mercier ................................. 60/386 |
| 3,463,260 | 7/1969 | Baines et al. .......................... 180/132 |
| 3,473,324 | 10/1969 | Mercier ........................... 180/132 X |
| 4,041,983 | 8/1977 | Bianchetta ........................ 91/433 X |
| 4,085,817 | 4/1978 | Kervagoret ........................... 180/132 |

FOREIGN PATENT DOCUMENTS

| 2242022 | 3/1974 | Fed. Rep. of Germany ... 74/388 PS |
| 2946274 | 3/1981 | Fed. Rep. of Germany . |
| 1465422 | 12/1966 | France . |
| WO81/01124 | 4/1981 | PCT Int'l Appl. ............. 137/625.66 |

Primary Examiner—Joseph F. Peters, Jr.
Assistant Examiner—Mitchell J. Hill

[57] ABSTRACT

An improved hydraulic control valve is disclosed for providing the metering of fluid to a steering arrangement such as that normally employed on a motorized vehicle. The steering arrangement includes a piston-cylinder assembly, a main pump for supplying pressurized fluid from a fluid reservoir to the control valve and a control pump connected to the control valve which is actuated by a manually operated steering mechanism. The improved control valve includes a housing having an elongated bore formed therein. Movably positioned within the bore is a valve spool which has at least three annular grooves formed thereon separated by a pair of lands. The valve spool also contains a longitudinal bore formed therein which intersects a transverse bore which opens into the centrally positioned annular groove. The valve spool cooperates with the elongated bore to form control pressure chambers at each end thereof. Also positioned at each end of the valve spool are check valves which are closed when the valve spool is in a neutral position and which open when the valve spool is subjected to pressure loading. Fluid flow through the valve is directed by a plurality of passages formed in the housing. One of the passages connects the main pump to the elongated bore, while two working passages connect opposite ends of the piston-cylinder assembly to the elongated bore approximate the outer two annular grooves which are formed in the valve spool. There are also two control passages connecting the opposite ends of the control pump to the elongated bore approximate the pair of lands formed on the valve spool and at least one reservoir passage connecting the reservoir to the elongated bore approximately between an outer end of the valve spool and the outer annular groove formed thereon. This improved hydraulic control valve can be used for any constant pressure system.

13 Claims, 6 Drawing Figures

HYDRAULIC CONTROL VALVE

FIELD OF THE INVENTION

This invention relates to an improved hydraulic control valve for use in a constant pressure steering system on a vehicle and more particularly to a control valve exhibiting fine control features.

BACKGROUND OF THE INVENTION

Hydraulic control valves have been used in vehicle steering systems for many years and they have exhibited various configurations. One such control valve is taught in FIG. 4 of the French Pat. No. 1,465,422. Here a valve spool is shown having two lands which close off two working ports when the valve spool is in the neutral position. As the valve spool is displaced, one of the working ports is connected to a control pressure chamber while the other working port is connected to a tank port. The main pump in the hydraulic circuit is connected directly to both of the control pressure chambers by way of respective check valves and when the valve spool is in the neutral position, is connected to the tank port by way of a short-circuit path. Upon displacement of the manually operable steering wheel, the pressure in the two control pressure chambers is altered such that the valve spool is moved from its neutral position. Pressurized fluid then flows from the main pump into one of the piston-cylinder assemblies while the other pressure chamber is connected to the tank. In this arrangement, the control valve can be used only in a constant flow system because the control valve is open in the central position. Also, the control pump is in a pressure-less condition when the valve spool is in the neutral position. The disadvantage of this kind of control device is that there is no possibility of finely controlling movement of the valve spool. Therefore, the steering wheel must be continuously turned throughout the entire steering operation for otherwise the valve spool will move back to its neutral position. When this control valve is used in a road vehicle, there is the likelihood that the association between the steering wheel position and the position of the vehicle's wheels will change. Furthermore, the pressurized oil can only be coarsely metered by the control pump during rotation of the steering wheel.

A second type of hydraulic control valve is taught in German Pat. No. 2,946,274. In this patent, a control valve is described which can be used with a piston-cylinder assembly which incorporates a differential piston. A control valve uses two throttle means (29 and 30) which are adjustable in opposite directions to form a pressure divider. The disadvantage of this type of valve is that when an external force arises, the manually operable steering wheel must be held stationary or otherwise it will rotate in accordance with the movement of the piston. A second disadvantage is that the pressure within the valve must first be built up after the engine is started. Such a buildup in pressure is possible only if either the steering wheel or the vehicle's wheels are turned. This may at times be difficult, for example, when the vehicle's wheels are locked by a curbstone.

Now an improved hydraulic control valve has been invented which can be used in a constant pressure steering system on a vehicle and which permits fine control.

SUMMARY OF THE INVENTION

Briefly, this invention relates to an improved hydraulic control valve for providing metering the fluid to a steering arrangement on a vehicle. The steering arrangement includes a piston-cylinder assembly, a main pump for supplying pressurized fluid from a fluid reservoir to the control valve and a control pump connected to the control valve which is actuated by a manually operated steering mechanism. The improvement relates to a valve housing having an elongated bore formed therein. Located within the bore is a movable valve spool which has at least three annular grooves formed thereon which are separated by a pair of lands. Formed within the valve spool is a longitudinal bore which is intersected by a traverse bore which opens into the centrally positioned annular groove. The valve spool cooperates with the elongated bore to form a control pressure chamber at each end thereof. Also located at each end of the valve spool are check valves which are normally closed in the neutral position and which independently open when the valve spool is subjected to pressurized fluid forces. The pressurized fluid is directed through the system by a plurality of passages formed in the housing. One of the passages connects the main pump to the elongated bore approximate the central annular groove while two working passages connect opposite ends of the piston-cylinder assembly to the elongated bore approximate the outer two annular grooves on the valve spool. There are also a pair of control passages connecting opposite ends of the control pump to the elongated bore approximate the pair of lands formed on the valve spool and at least one reservoir passage which connects the reservoir to the elongated bore approximately between an outer end of said valve spool and the adjacent outer annular groove. All of the above positions are relevant when the valve spool is in its neutral position.

The general object of this invention is to provide an improved hydraulic control valve for the metering of fluid in a steering arrangement. A more specific object of this invention is to provide an improved hydraulic control valve which uses fine control grooves to finely meter the flow of fluid to a steering system on a vehicle.

Another object of this invention is to provide an improved hydraulic control valve which permits the fine control of fluid in a constant pressure system.

Still another object of this invention is to provide an improved hydraulic control valve which uses a valve spool which is actuatable by both low and high pressures.

Still further an object of this invention is to provide an improved hydraulic control valve which is economical to manufacture and simple in construction.

Other objects and advantages of the present invention will become more apparent to those skilled in the art in view of the following description and the accompanying drawings.

DETAILED DESCRIPTION OF THE PREFERRED EMBODIMENT

Figure 1:
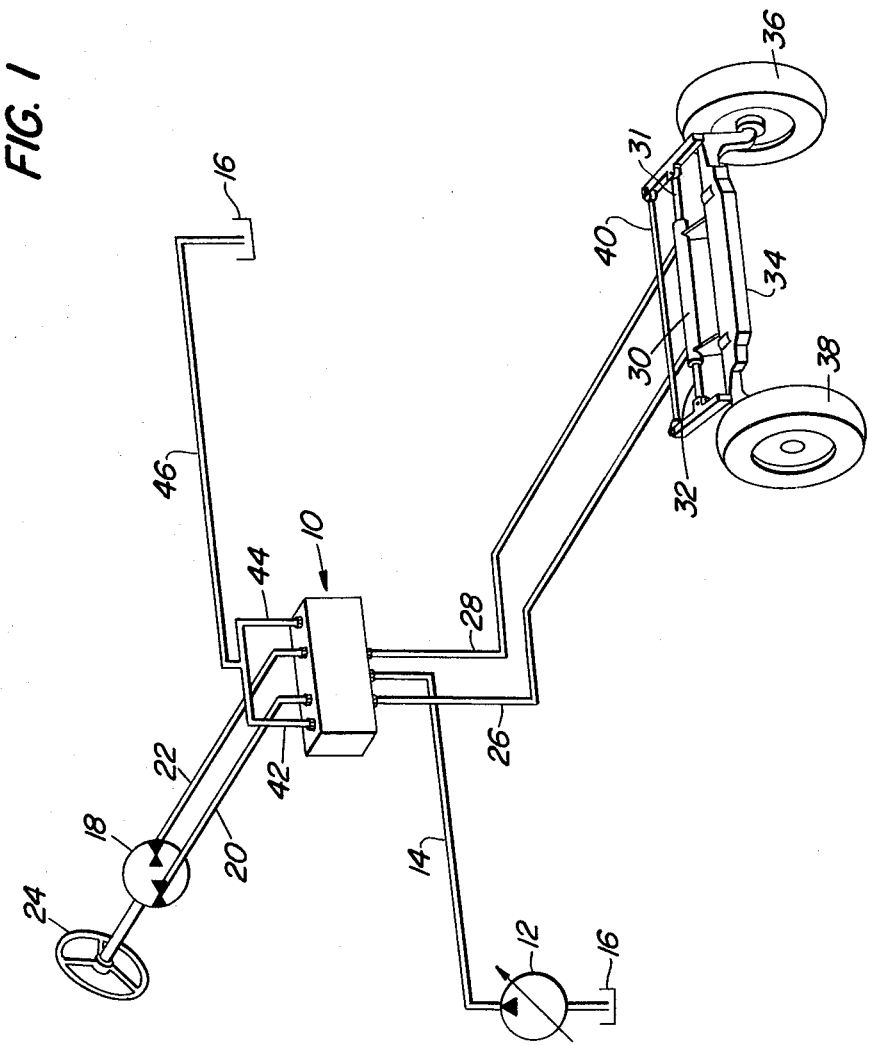
FIG. 1 is a perspective view of a hydraulic control system.

Referring to FIG. 1, an improved hydraulic control valve 10 is shown connected to a variable displacement pump 12 by a conduit or passage 14. The pump 12 draws fluid from a reservoir 16 and pressurizes it to a predetermined value before supplying it to the hydraulic control valve 10. Also connected to the control valve 10 is a control pump 18 via control passages 20 and 22. The control pump 18 is actuated by a manually operable steering wheel 24. Extending outward from the control valve 10 are a pair of working passages 26 and 28 which are connected at their opposite ends to the left and the right ends of a steering cylinder 30. The steering cylinder 30 has a pair of oppositely aligned piston rods 31 and 32 extending outward therefrom. The steering arrangement on a vehicle also includes an axle 34, left and right wheels 36 and 38 and a mechanical linkage 40 which physically attaches the two wheels 36 and 38 together so that they will turn simultaneously. As shown in FIG. 1, the control valve 10 also has a pair of reservoir passages 42 and 44 extending outward therefrom which are depicted converging into a single passage 46 which returns oil back to the reservoir 16.

As shown in FIG. 1, the steering arrangement is designed such that as the operator turns the steering wheel 24 to the left, as viewed from inside the operator's station of the vehicle, fluid is routed into the hydraulic control valve 10 by the control pump 18 via conduit 22. As a result of the increase in pressure in the control valve 10, the fluid is displaced through the working passage 28 to the steering cylinder 30. This fluid then activates the left and right piston rods 31 and 32, respectively, thereby turning the left and right wheels 36 and 38 to the left. The fluid which is displaced from the right side of the steering cylinder 30 is conveyed through the conduit 26 back to the control valve 10 and is routed through the passages 42 and 46 to the reservoir 16. In the meantime, the main pump 12 supplies pressurized fluid, preferably hydraulic oil, through the passage 14 to the control valve 10. This oil is then routed through the passage 20 to the control pump 18. The control pump 18 pumps fluid in an opposite direction when the steering wheel 24 is turned to the right.

The specifics of the control valve 10 will now be described by referring to FIGS. 2-6. The control valve 10 is shown having a housing 48 with an elongated bore 50 formed therein. Movably positioned within the elongated bore 50 is a valve spool 52 which contains at least three annular grooves 54, 56 and 58 formed in its outer periphery with groove 56 being centrally located. The three annular grooves 54, 56 and 58 are separated by a pair of lands 60 and 62 which contact the inner diameter of the elongated bore 50. The valve spool 52 also contains a longitudinal bore 64 and a transverse bore 66. The transverse bore 66 intersects the longitudinal bore and opens into the centrally positioned annular groove 56. The longitudinal bore 64 communicates with ends 68 and 70 of the valve spool 52.

The valve spool 52 cooperates with the elongated bore to form two pressure chambers 72 and 74 at the ends 68 and 70 respectively. The function of these pressure chambers, 72 and 74, will be explained shortly. The pressure chambers 72 and 74 both have an internal diameter which is larger than the diameter of the elongated bore 50 such that shoulders 76 and 78 are formed at the surface between the elongated bore 50 and the pressure chamber 72 and 74.

The control valve 10 also includes a pair of disks 80 and 82 which abut against the shoulders 76 and 78 respectively, and also against step shoulders 84 and 86 formed on the valve spool 52 near its outer ends 68 and 70 respectively. The disks 80 and 82 are biased against the shoulders 76 and 78 respectively, by springs 88 and 90 which in turn contact outer surfaces 92 and 94 of the pressure chambers 72 and 74. The springs 88 and 90 preferably have progressive or non-linear spring characteristics such that as each spring is compressed, it requires a greater force to compress it further. Furthermore, both of the springs 88 and 90 should have essentially equal compressive values. When the springs 88 and 90 use a non-linear spring characteristic, the torque at the steering wheel 24 is load dependent, thereby permitting controlled steering.

To aid in guiding or retaining the springs 88 and 90 in position, the end portions of the valve spool 52 are frustoconically shaped. Preferably, the frusto-conical portions 96 and 98, best shown in FIG. 4, extend outwards from the step shoulders 84 and 86 to the outer end 68 and 70, respectively.

Figure 2:
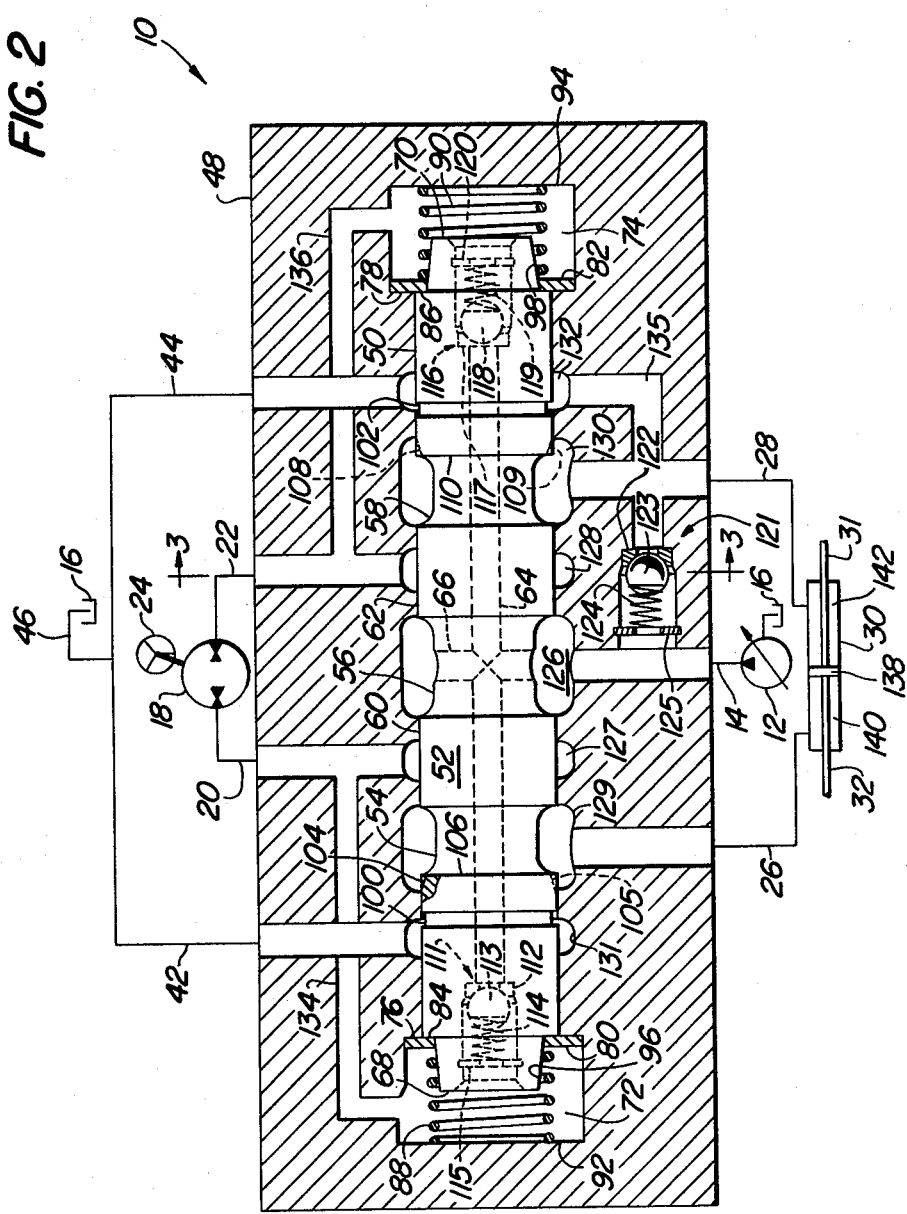
FIG. 2 is a circuit diagram of the hydraulic control system of FIG. 1 showing the improved hydraulic control valve in cross section.
Figure 5:
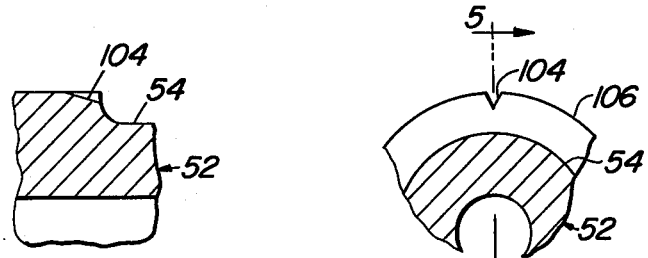
FIG. 5 is an enlarged cross-sectional view of one of the fine control grooves taken along the line 5—5 of FIG. 6.
Figure 6:
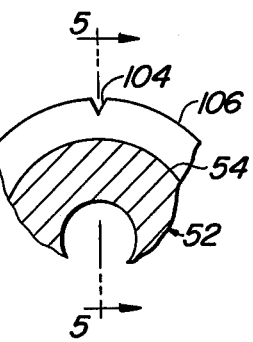
FIG. 6 is an enlarged longitudinal cross-sectional view taken along the line 6—6 of FIG. 4.

The valve spool 52 also has annular configured pressure relief grooves 100 and 102 formed on its outer periphery between the outer annular grooves 54 and 58 and the ends 68 and 70, respectively. The pressure relief grooves 100 and 102 are aligned with the reservoir passages 42 and 44 when the valve spool 52 is in its neutral position as shown in FIG. 2 and permit use of the control valve 10 when a differential working area piston is used in a pair of steering cylinders. In addition, the valve spool 52 has fine control grooves 104 and 105 positioned on an outermost edge 106 of the annular groove 54 and fine control grooves 108 and 109 positioned on an outer edge 110 of the annular groove 58. Preferably, the fine control grooves 104, 105, 108 and 109 are triangular in cross section as well as in longitudinal section as is shown in FIGS. 5 and 6. The fine control grooves 104, 105, 108 and 109 permit a fine metering of fluid around the valve spool 52 when there is a slight axial movement of the valve spool 52 from its neutral position. Likewise, the fine control grooves 104, 105, 108 and 109 permit a rapid flow of fluid around the valve spool 52 when the valve spool 52 is displaced a greater distance within the elongated bore 50.

The control valve 10 also includes a pair of check members 111 and 116 which are positioned at the outer ends 68 and 70 of the valve spool 52. The check member 111 includes a valve seat 112, a ball 113, spring 114, and a retainer 115, such as a snap ring, all of which are preferably positioned within the confines of the valve spool 52 and which are aligned with the longitudinal bore 64. The check member 116 is similar in design and also contains a valve seat 117, a ball 118, a spring 119 and a retainer 120, all of which are preferably positioned within the confines of the valve spool 52 and which are aligned with the opposite ends of the longitudinal bore 64. Both of the check balls 113 and 118 are normally biased to a closed position by the springs 114 and 119, respectively, when the valve spool 52 is in its neutral position. This means that fluid flow through the longitudinal bore 64 is prevented when the valve spool 52 is in its neutral position. The check balls 113 and 118 are independently opened by a pressure differential thereacross. For example, once the fluid pressure acting on the right-hand portion of the ball 113 exceeds the pressure acting to the left-hand portion of the ball 113, the ball 113 will move leftward to an open position and permit fluid in the longitudinal bore 64 to pass into the pressure chamber 72.

The control valve 10 further includes a third check member 121 which is positioned in a passage 135 which connects the main passage 14 to the reservoir passage 44. The third check member 121 includes a valve seat 122, a ball 123, a spring 124 and a retainer 125. The third check ball 123 is biased by the spring 124 to a closed position blocking off the passage 135. However, should fluid flow from the pump 12 cease for some reason when the control pump 18 is drawing fluid, a lower pressure will be created on the left side of the third check ball 123 which will cause it to move to the left off of the valve seat 122. This action will permit fluid contained in the reservoir passage 44 to flow into the passage 14 and eventually to the control pump 18.

Figure 3:
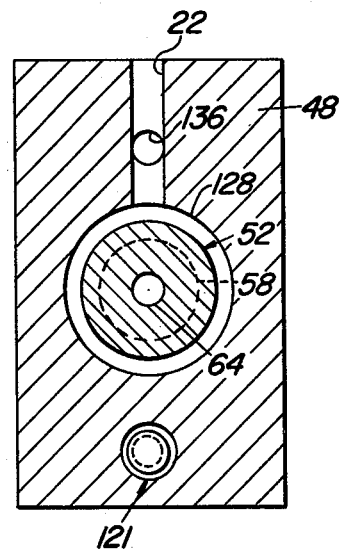
FIG. 3 is a cross-sectional view of the control valve taken along the line 3—3 of FIG. 2.
Figure 4:
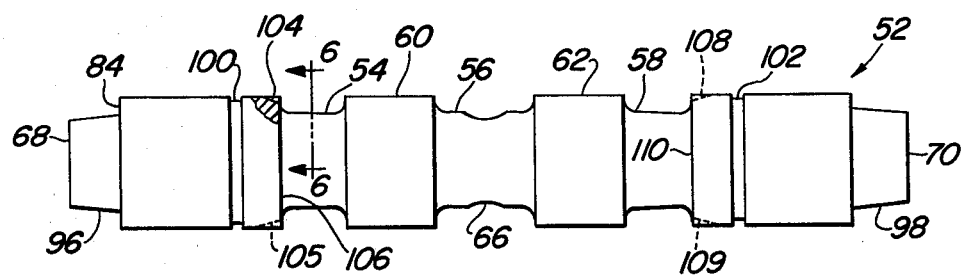
FIG. 4 is a plane view of the valve spool.

It should be noted that in FIG. 2, the main passage 14, the control passages 20 and 22, the working passages 26 and 28, and the reservoir passages 42 and 44 are shown extending into the housing 48 of the control valve 10. These passages are depicted as opening into annular grooves 126–132 which are formed on the inner surface of the elongated bore 50. In addition, two blind passages 134 and 136, see FIGS. 2 and 3, are present which connect the pressure chambers 72 and 74, to the control passages 20 and 22, respectively. The blind passages 134 and 136 provide a means for permitting fluid to get into and out of the pressure chambers 72 and 74 when the check valves 111 and 116 are closed.

Lastly, as shown in FIG. 2, the piston-cylinder assembly 30 is depicted as having a single piston 138 with the piston rods 31 and 32 extending outward therefrom. The piston 138 cooperates with the cylinder 30 to form a pair of pressure chambers 140 and 142, respectively. Although the piston 138 is depicted as having two working surfaces of equal area, it is also possible to use two separate steering cylinders and to use pistons having working areas of unequal size as is well known to those skilled in the art.

OPERATION

The operation of the improved hydraulic control valve 10 will be described starting from a position wherein the valve spool 52 is in a neutral position and the operator begins to turn the steering wheel 24 to the left as viewed from the operator's compartment in the vehicle. By turning the steering wheel 24 to the left once the vehicle's engine is running, the control pump 18 will force fluid through the passages 22 and 136 into the pressure chamber 74 thereby causing a buildup of pressure therein. The buildup of pressure in the pressure chamber 74 causes a pressure difference to occur between the pressure chamber 72 and the pressure chamber 74, with pressure chamber 74 being at a higher pressure. This pressure difference causes the valve spool 52 to move towards the left and permits pressurized fluid from the main pump 12 to flow through the passage 14 to the annular groove 126, around the groove 56, into annular groove 127 and then into the passage 20 leading to the control pump 18. Simultaneously, pressurized fluid in the passages 14 is routed through the transverse bore 66 to the longitudinal bore 64 and impinges on the check ball 113. As the pressure force on the check ball 113 exceeds the force of both the spring 114 and the pressure in the pressure chamber 72, the check ball 113 will open thereby permitting fluid flow into the pressure chamber 72. At the same time, fluid from the control pump 18 is permitted to pass from the control passage 22 to the annular groove 128, around the groove 58, into the annular groove 130 and through the working passage 28 into the pressure chamber 142 of the steering cylinder 30. As the pressure increases within the chamber 142, the piston 138 is moved thereby causing the wheels 36 and 38 to turn to the left. The fluid which is displaced out of the pressure chamber 140 of the steering cylinder 30 is routed through the passage 26, the annular groove 129, around the groove 54, into the annular groove 131 and then to the reservoir passage 42. From the reservoir passage 42, the fluid is conveyed through the return passage 46 to the reservoir 16. Once the operator stops turning the steering wheel 24 to the left, the control pump 18 will no longer draw fluid from the control passage 20. At this moment, the fluid in the main passage 14 will be directed through the longitudinal bore 64 into the pressure chamber 72. As more and more fluid is conveyed into the pressure chamber 72, the pressure will rise until it is equal to the pressure in the control pressure chamber 74. When this occurs, the spring 88 will move the valve spool 52 back to its neutral position. The spring 88 can not move the valve spool 52 beyond its neutral position because of the interaction of the disk 80 with the shoulder 76. This design feature assures that even if the two springs 88 and 90 are of unequal strength, the valve spool 52 will always be returned to its neutral position.

The pressure relief grooves 100 and 102 communicates with the reservoir passages 42 and 44 and the annular grooves 131 and 132 respectively when the valve spool 52 is in the neutral position. The pressure relief grooves 100 and 102 function to reduce any undesired increase in pressure in the working passages 26 or 28 and the annular grooves 129 or 130, respectively. The pressure relief grooves 100 and 102 also serve to prevent a fall in pressure from the annular grooves 129 or 130 to the annular grooves 127 or 128, respectively.

It should be noted that the fine control grooves 104, 105, 108 and 109 operate to cause a reduction in pressure at the annular grooves 129 and 130 respectively. When the valve spool 52 is subjected to a low load, the return oil from the pressure chamber 140 passes through the fine control grooves 104 and 105 to the reservoir passage 42. When there is a high load, movement of the valve spool 52 is greater and the return oil from the pressure chamber 140 can flow from the annular groove 129 directly into the annular groove 131 so that the drop in pressure is greater.

Movement of the steering wheel 24 to the right will cause the piston 138 within the steering cylinder 30 to move in an opposite direction thereby causing the wheels 36 and 38 to turn to the right. The operation is just the reverse of that described above with the valve spool 52 being moved to the right from the neutral position shown in FIG. 2.

In the event of failure of the supply of pressurized fluid from the main pump 12 while the control pump 18 is operating, a pressure differential is formed across the check valve 121. As this occurs, the check ball 123 will be forced leftward and open such that fluid in the reservoir 16 can be routed through the reservoir passage 44, around the check valve 121 and into the main passage 14. From here the fluid passes through the annular grooves 126 and 127 to the control passage 20. This assures that there is an adequate supply of fluid to operate the control valve 10 even when the pump 12 is not working.

The improved hydraulic control valve 10 as described herein, can be used for any constant pressure system and for any pressures which are normally employed. It is also insensitive in regard to cold oil.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. An improved hydraulic control valve for providing metering of fluid to a steering arrangement, said steering arrangement including a piston-cylinder assembly, a main pump for supplying pressurized fluid from a fluid reservoir to said control valve, and a control pump connected to said control valve and being actuated by a manually operable steering mechanism, wherein said improvement comprises:
   (a) a valve housing having an elongated bore formed therein;
   (b) a valve spool movably positioned within said elongated bore and having at least three annular grooves formed thereon separated by a pair of lands, a longitudinal bore formed therein and a transverse bore which intersects said longitudinal bore and which opens into the centrally positioned annular groove, said valve spool cooperating with said elongated bore to form a control pressure chamber at each end thereof;
   (c) check valves positioned at each end of said valve spool which close off said longitudinal bore when said valve spool is in a neutral position and which open when said valve spool is subjected to pressure loading at said ends; and
   (d) a plurality of passages formed in said housing, one of said passages connecting said main pump to said elongated bore, two working passages connecting opposite ends of said piston-cylinder assembly to said elongated bore approximate the outer two of said three annular grooves formed on said valve spool, two control passages connecting opposite ends of said control pump to said elongated bore approximate said pair of lands formed on said valve spool, and at least one reservoir passage connecting said reservoir to said elongated bore approximately between an outer end of said valve spool and an adjacent annular groove.

2. The improved hydraulic control valve of claim 1 wherein fine control grooves are formed in said valve spool adjacent to an outermost edge of each of said outer two annular grooves.

3. The improved hydraulic control valve of claim 2 wherein said fine control grooves are triangular in cross section and in longitudinal section.

4. The improved hydraulic control valve of claim 1 wherein said valve spool has a frusto-conical projection at each end.

5. The improved hydraulic control valve of claim 1 wherein pressure relief grooves are formed between said outer two annular grooves and said ends of said valve spool and which communicate with said reservoir passages when said valve spool is in a neutral position.

6. The improved hydraulic control valve of claim 5 wherein said pressure relief grooves are annular.

7. The improved hydraulic control valve of claim 1 wherein a pair of blind passages are formed in said housing which connect each of said two control passages to one of said control pressure chambers.

8. The improved hydraulic control valve of claim 1 wherein said working passages, said control passages, said reservoir passage, and said passage from said maim pump, all open into annular grooves formed in said housing about said elongated bore.

9. The improved hydraulic control valve of claim 1 wherein said valve spool is centered to a neutral position within said elongated bore by a spring at each end.

10. The improved hydraulic control valve of claim 9 wherein said springs have nonlinear, compressive force characteristics.

11. The improved hydraulic control valve of claim 9 wherein said springs bear against disk members which in turn bear against support shoulders formed both on said housing and on said valve spool when said valve spool is in said neutral position.

12. The improved hydraulic control valve of claim 1 wherein a passage is formed in said housing between said reservoir passage and said passage connecting said main pump to said elongated bore and a check valve is positioned across said passage to prevent fluid flow ouf of said main passage.

13. An improved hydraulic control valve for providing metering of fluid to a steering arrangement, said steering arrangement including at least one piston-cylinder assembly, a main pump for supplying pressurized fluid from a fluid reservoir to said control valve, and a control pump connected to said control valve and being actuated by a manually operable steering mechanism, wherein said improvement comprises:
   (a) a valve housing having an elongated bore formed therein;
   (b) a valve spool movably positioned within said elongated bore and having at least three annular grooves formed thereon separated by a pair of lands, a longitudinal bore formed therein and a transverse bore which intersects said longitudinal bore and which opens into the centrally positioned annular groove, said valve spool cooperating with said elongated bore to form a control pressure chamber at each end thereof;
   (c) check valves positioned at each end of said valve spool which close off said longitudinal bore when said valve spool is in a neutral position and which will open when said valve spool is subjected to pressure loading at said ends;
   (d) springs positioned in each of said control pressure chambers which abut up against said ends of said valve spool to urge said valve spool toward a neutral position within said elongated bore; and
   (e) a plurality of passages formed in said housing, one of said passages connecting said main pump to said elongated bore, two working passages connecting opposite ends of said piston-cylinder assembly to said elongated bore approximate the outer two of said three annular grooves formed on said valve spool, two control passages connecting opposite ends of said control pump to said elongated bore approximate said pair of lands formed on said valve spool, two blind passages connecting each of said two control passages to one of said control pressure chambers, and two reservoir passages connecting said reservoir to said elongated bore approximately between an outer end of said valve spool and an adjacent annular groove.

* * * * *